US 6,739,726 B2

(12) United States Patent
Li (10) Patent No.: US 6,739,726 B2
(45) Date of Patent: May 25, 2004

(54) ILLUMINATION ENGINE FOR A PROJECTION DISPLAY USING A TAPERED LIGHT PIPE

(75) Inventor: Kenneth K. Li, Arcadia, CA (US)

(73) Assignee: Wavien, Inc., Santa Clarita, CA (US)

( * ) Notice: Subject to any disclaimer, the term of this patent is extended or adjusted under 35 U.S.C. 154(b) by 0 days.

(21) Appl. No.: 10/062,728

(22) Filed: Feb. 5, 2002

(65) Prior Publication Data
US 2002/0154510 A1 Oct. 24, 2002

Related U.S. Application Data
(60) Provisional application No. 60/286,982, filed on Apr. 30, 2001, provisional application No. 60/313,106, filed on Aug. 20, 2001, provisional application No. 60/329,320, filed on Oct. 16, 2001, and provisional application No. 60/265,889, filed on Feb. 5, 2001.

(51) Int. Cl.[7] .................................................. G03B 21/28
(52) U.S. Cl. ........................... 353/98; 353/102; 353/20; 385/901
(58) Field of Search ............................. 353/31, 98, 99, 353/102, 20, 38, 97; 385/11, 34, 133, 146, 901; 349/5, 7, 8, 9, 67

(56) References Cited

U.S. PATENT DOCUMENTS

| | | |
|---|---|---|
| 1,163,192 A | 12/1915 | Adams |
| 2,891,437 A | 6/1959 | Tripp |
| 3,986,767 A | 10/1976 | Rexer et al. |
| 4,458,302 A | 7/1984 | Shiba et al. |
| 4,473,295 A | 9/1984 | Doyle |
| 4,735,495 A | 4/1988 | Henkes |
| 4,747,030 A | 5/1988 | Offner et al. |
| 4,755,918 A | 7/1988 | Pristash et al. |
| 4,757,431 A | 7/1988 | Cross et al. |
| 5,130,913 A | 7/1992 | David |
| 5,191,393 A | 3/1993 | Hignette et al. |
| 5,317,484 A | 5/1994 | Davenport et al. |
| 5,414,600 A | 5/1995 | Strobl et al. |
| 5,430,634 A | 7/1995 | Baker et al. |
| 5,541,746 A | 7/1996 | Hamagishi et al. |
| 5,625,738 A | 4/1997 | Magarill |
| 5,748,376 A | 5/1998 | Lin et al. |
| 5,751,480 A | 5/1998 | Kitagishi |
| 5,772,313 A | 6/1998 | Taylor |
| 5,829,858 A | 11/1998 | Levis et al. |
| 5,884,991 A | 3/1999 | Levis et al. |
| 5,890,795 A | 4/1999 | Taylor |
| 6,053,615 A | 4/2000 | Peterson et al. |
| 6,139,157 A | 10/2000 | Okuyuma |

Primary Examiner—William C. Dowling
(74) Attorney, Agent, or Firm—Rothwell, Figg, Ernst & Manbeck, PC (57) ABSTRACT

An illumination engine for a projection display using a TLP including a reflector having a first focal point and second focal points. A source of electro-magnetic radiation disposed proximate to the first focal point of the reflector emits rays of radiation that reflect from the reflector toward the second focal point. A TLP collects and transmits substantially all of the radiation converged at the second focal point, adjusting the numerical aperture of the radiation, but curving the surface formed by the images of the radiation. A SLP or a lens collects and transmits substantially all of the radiation transmitted by the TLP, flattening the surface formed by the images of the radiation. A condenser lens collects and transmits substantially all of the radiation transmitted by the contoured delay element to a PBS and a projection system.

59 Claims, 9 Drawing Sheets

ILLUMINATION ENGINE FOR A PROJECTION DISPLAY USING A TAPERED LIGHT PIPE

CROSS-REFERENCE TO RELATED APPLICATIONS

This application claims priority to Provisional Applications Serial Nos. 60/265,889, filed Feb. 5, 2001, 60/286,982, filed Apr. 30, 2001, 60/313,106, filed Aug. 20, 2001, and 60/329,320, filed Oct. 16, 2001, the disclosures of which are incorporated by reference.

BACKGROUND OF THE INVENTION

1. Field of Invention

This invention relates to the polarization of light from a tapered light pipe (TLP) in a projection system.

2. Description of the Related Art

Polarized light may be used to illuminate LCD imagers in LCD-type projection displays. LCD imagers may be, e.g. transmissive or reflective. Light input to the LCD imager may be polarized such that when the LCD pixels are modulated, the polarization of the selected pixels may be changed, and when the light output from the imager is analyzed by another polarizer, the selected pixels are darkened. When the pixels are modulated with the desired information, the information will be projected onto the screen.

When light is polarized, however, only half of the light will be of the correct polarization. The other half will be incorrectly polarized. Some of the incorrectly polarized light can be recovered by rotating the polarization with a certain efficiency, giving an overall efficiency of over 50%. Some of the incorrectly polarized light may be recovered, e.g., by passing it through a half-wave plate, after which it may be re-combined with the correctly polarized light.

Figure 1A:
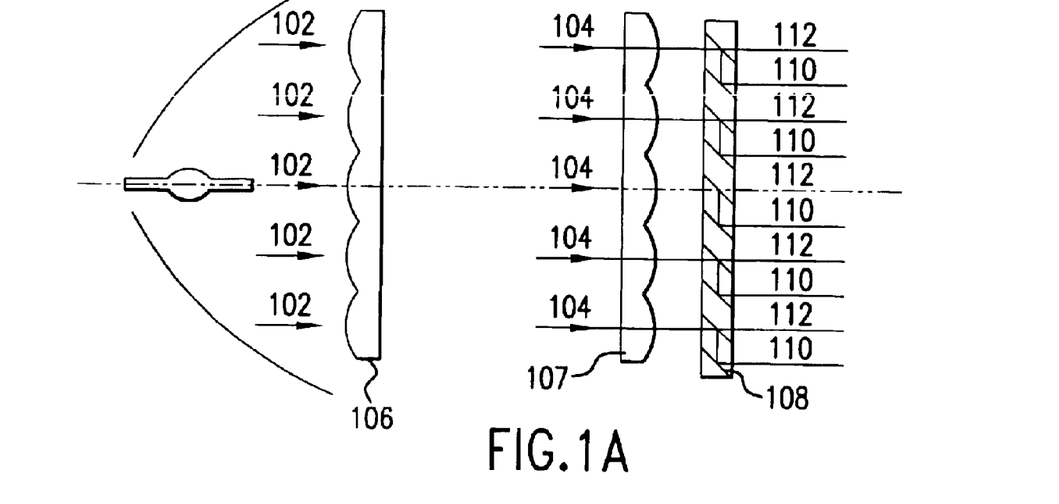
In FIG. 1 is shown a schematic diagram of a parabolic reflector system using fly eye lenses for use with a polarization system.
Figure 1B:
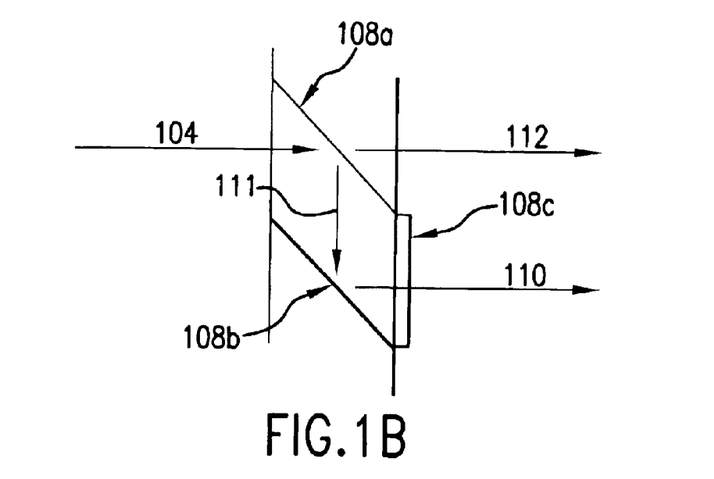

In one polarization technique, as shown in FIG. 1a, a parallel beam of light 102 from a parabolic reflector may be focused into multiple beams 104 by using an array of lenses 106 called a fly eye lens. Each of the beams 104 may be refocused by another array of lenses 107 onto an array of polarizing beam splitters (PBS) 108. The PBS is a one dimensional array with stripes. A cell of PBS array 108 is shown in detail in FIG. 1b. A coating 108a on PBS 108 separates the input beam 104 into the parallel and perpendicular beams of light 111, 112. Beam 111 is redirected to the output direction by reflector 108b. The polarization of beam 111 is rotated by a half-wave plate 108c such that the exit beam 110 has the same polarization as beam 112.

Figure 2:
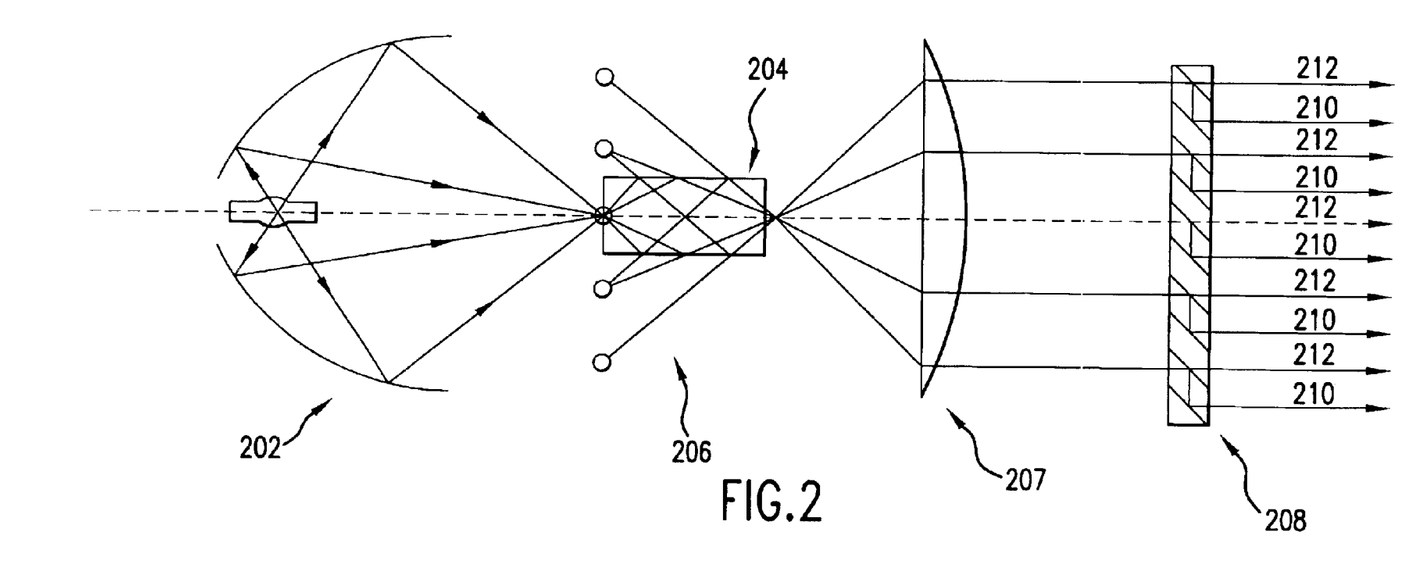
In FIG. 2 is shown a schematic diagram of an elliptical reflector system and SLP for use with a polarization system.

In another polarization technique, as shown in FIG. 2, an elliptical reflector 202 may be used to focus light. In such a focused light system a straight light pipe (SLP) 204 is often used to collect and homogenize the beam profile, as described in U.S. Pat. No. 6,139,157, the disclosure of which is incorporated by reference. Multiple images 206 of the focused light are formed when viewed from the output of the SLP 204 due to the multiple reflections of the focused light by the sidewalls of the light pipe. The multiple images 206 may then be imaged onto PBS array 208 by lens 207. The two dimensional array of images formed by the SLP 204 is matched with PBS array 208 by having each row of the images image onto each stripe of the PBS array in a manner similar to the fly eye lens to produce light 210, 212 with the same polarization.

Figure 3:
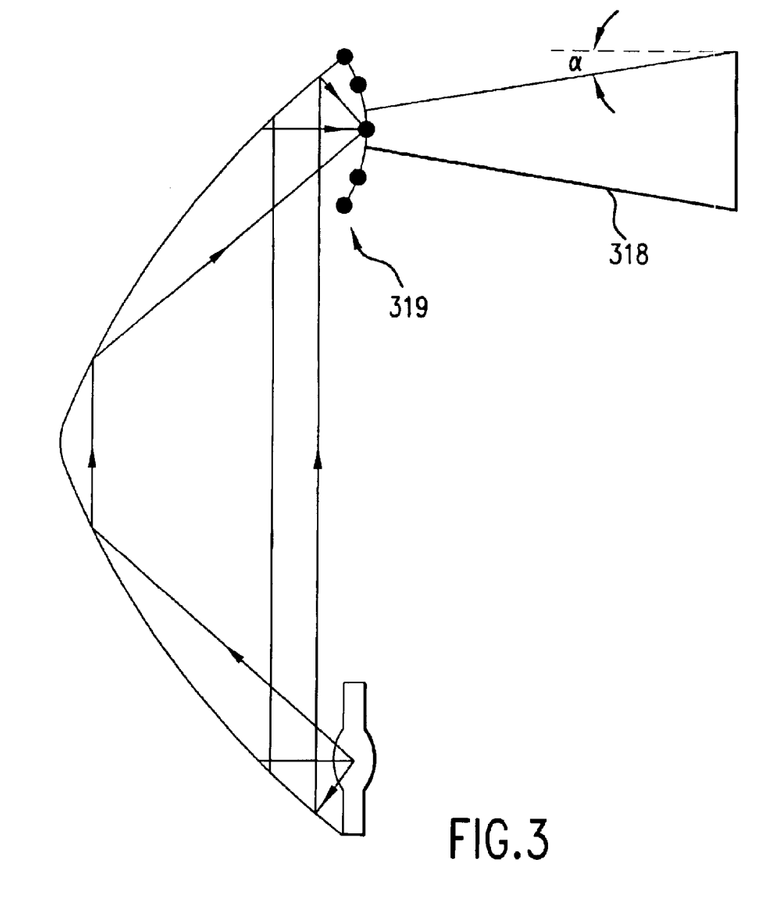
In FIG. 3 is shown a schematic diagram of a dual paraboloid reflector and TLP illumination engine.

In optical systems where a 1:1 imaging system is needed for improved performance, a dual paraboloid reflector system may be used to focus the light. In a dual paraboloid reflector system, however, the focused light may have a very high numerical aperture (NA). A tapered light pipe (TLP) 318 may be used to transform a large NA to a smaller one in order to process the light further, as shown in FIG. 3.

Although multiple images of the focused light are formed when viewed from the output of the TLP 318 in a manner similar to the SLP, the reflections of the focused light do not form a flat surface at the output of the TLP. Rather, the focused light forms a curved surface 319 by the multiple reflections of the TLP. The degree of curvature of the surface 319 may be dependent on the angle of taper α (alpha) of the TLP 318. The taper angle α may be different in the horizontal and vertical directions to meet system requirements. Focusing this curved surface 319 to a flat surface PBS array may be expensive and difficult. There remains a need, therefore, for a system that can convert such a curved surface into a planar surface in order to perform polarization of light from a TLP.

SUMMARY OF THE INVENTION

An illumination engine for a projection display using a TLP is disclosed in one embodiment. The illumination engine includes a reflector having a first and second focal points, a source of electro-magnetic radiation disposed proximate to the first focal point of the reflector to emit rays of radiation that reflect from the reflector and converge substantially at the second focal point, a TLP having an input surface and an output surface, the input surface of the TLP disposed proximate to the second focal point to collect and transmit substantially all of the radiation, a SLP having an input surface and an output surface, the input surface of the SLP disposed proximate to the output surface of the TLP to collect and transmit substantially all of the radiation, a condenser lens disposed proximate to the output surface of the SLP to collect and transmit substantially all of the radiation, and a PBS disposed proximate to the condenser lens to collect and transmit substantially all of the radiation.

A method for using a TLP in a projection display is disclosed in a second embodiment. The method may be performed by positioning a source of electro-magnetic radiation at a first focal point of a reflector, producing rays of radiation by the source, reflecting the rays of radiation by the reflector toward a second focal point, positioning a TLP having an input surface and output surface so the input surface of the TLP is substantially proximate to the second focal point, collecting the rays of radiation at the input surface of the TLP, adjusting a numerical aperture of the radiation by passing the rays of radiation through the TLP, outputting rays of radiation from the output surface of the TLP, positioning a SLP having an input surface and output surface so the input surface of the SLP is substantially proximate to the output surface of the TLP, flattening a contour of the radiation by passing the rays of radiation through the SLP, and polarizing the radiation.

An illumination engine for a projection display using a TLP is disclosed in a third embodiment. The illumination engine includes a reflector having a first and second focal points, a source of electro-magnetic radiation disposed proximate to the first focal point of the reflector to emit rays of radiation that reflect from the reflector and converge substantially at the second focal point, a TLP having an input surface and an output surface, the input surface of the TLP disposed proximate to the second focal point to collect and transmit substantially all of the radiation, a lens having an input surface and an output surface, the input surface of the lens disposed proximate to the output surface of the TLP to collect and transmit substantially all of the radiation, a condenser lens disposed proximate to the output surface of the lens to collect and transmit substantially all of the radiation, and a PBS disposed proximate to the condenser lens to collect and transmit substantially all of the radiation. A lens or lens system is one example of a contoured delay element, as would be known to one of skill in the art.

A method for using a TLP in a projection display is disclosed in a fourth embodiment. The method may be performed by positioning a source of electro-magnetic radiation at a first focal point of a reflector, producing rays of radiation by the source, reflecting the rays of radiation by the reflector toward a second focal point, positioning a TLP having an input surface and output surface so the input surface of the TLP is substantially proximate to the second focal point, collecting the rays of radiation at the input surface of the TLP, adjusting a numerical aperture of the radiation by passing the rays of radiation through the TLP, outputting rays of radiation from the output surface of the TLP, positioning a lens having an input surface and output surface so the input surface of the lens is substantially proximate to the output surface of the TLP, flattening a contour of the radiation by passing the rays of radiation through the lens, and polarizing the radiation.

BRIEF DESCRIPTION OF THE SEVERAL VIEWS OF THE DRAWINGS

In FIG. 7b is shown a detail of the SLP of FIG. 7a; and

DETAILED DESCRIPTION OF THE PREFERRED EMBODIMENTS

Figure 4:
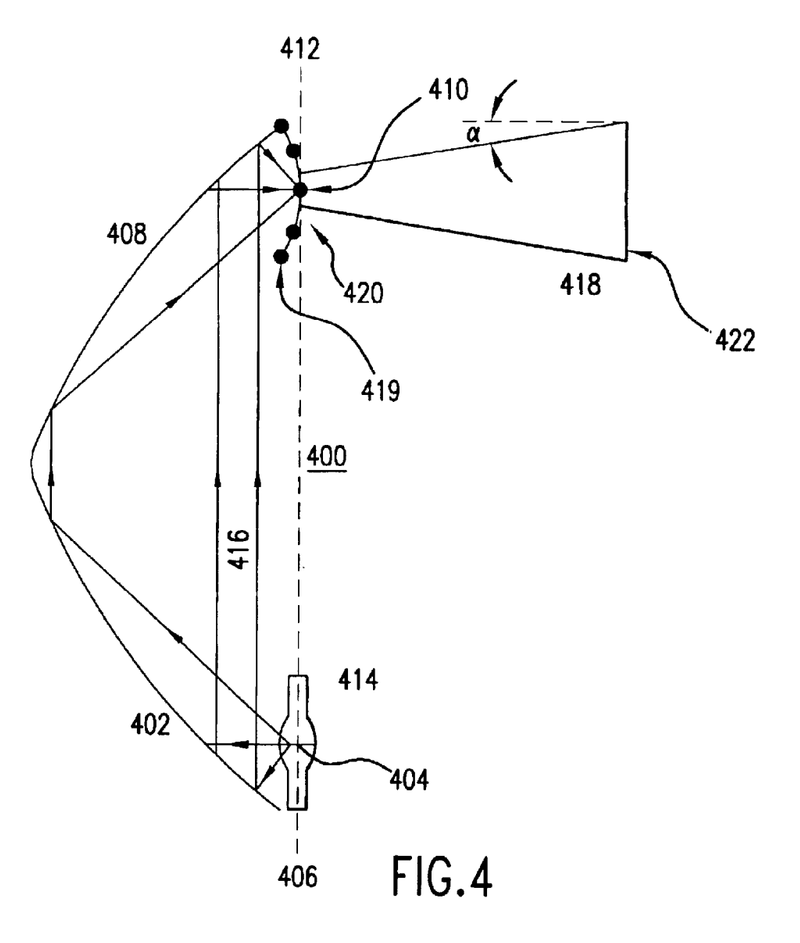
In FIG. 4 is shown a dual paraboloid reflector and a TLP polarization system for use with one embodiment of the invention.

In FIG. 4 is shown an illumination engine 400 according to a first embodiment of the invention. The illumination engine 400 includes a first reflector 402 having a first focal point 404 and a first optical axis 406, a second reflector 408 having a second focal point 410 and a second optical axis 412 placed substantially symmetrically to the first reflector 402 such that the first and second optical axes 406, 412 are substantially collinear.

First and second reflectors 402 and 408 can be, in general, a single reflector with first and second focal points 404 and 410 connected by a single optical axis. This would be the case if, e.g. first and second reflectors 402 and 408 were one elliptical reflector. The following discussion applies therefore to an illumination engine 400 comprising both a single reflector, two separate reflectors, or any means of focusing radiation as would be known to those of skill in the art.

First and second reflectors 402, 408 may be portions of, e.g., substantially elliptical, toric, spherical, or parabolic surfaces of revolution. First reflector 402 may also be, e.g., a portion of a substantially elliptical surface of revolution while second reflector 408 comprises a portion of a substantially hyperbolic surface of revolution. Or else first reflector 402 could be, e.g., a portion of a substantially hyperbolic surface of revolution while second reflector 408 comprises a portion of a substantially elliptical surface of revolution.

First and second reflectors 402, 408 may have a coating that reflects only a pre-specified portion of the electromagnetic radiation spectrum. In various embodiments, the coating only reflects, e.g., visible light radiation, a pre-specified band of wavelengths of radiation, or a specific color of radiation.

A source of electro-magnetic radiation 414 may be placed near the first focal point 404 of the first reflector 402 to emit rays of radiation 416 that reflect from the first reflector 402 toward the second reflector 408 and converge substantially at the second focal point 410. Source of electro-magnetic radiation 414 may be, e.g. an arc lamp, such as a xenon lamp, a metal halide lamp, an HID lamp, or a mercury lamp. Source of electro-magnetic radiation 414 may also be a halogen lamp or a filament lamp.

The rays of radiation 416 converging at second focal point 410 may have a large numerical aperture. To reduce or adjust the numerical aperture, a TLP 418 having an input surface 420 and an output surface 422 may be positioned with the input surface 420 of the TLP 418 proximate to the second focal point 410. TLP 418 thus collects and transmits substantially all of the radiation 416 converging at second focal point 410, adjusting the numerical aperture of radiation 416 entering input surface 420 as well. If, e.g., TLP 418 expands from input surface 420 to output surface 422, the numerical aperture of radiation 416 at output surface 422 will be reduced.

In addition to adjusting the numerical aperture of radiation 416 entering input surface 420, the internal reflections of the walls of TLP 418 produces multiple images of the focus resulting in an array of images 419. Images 419 have a curved surface, with the degree of curvature of the curved surface depending on the angle of taper $\alpha$ (alpha) of TLP 418.

The cross-section of TLP 418 is preferably a rectangle, and the taper profile is preferably linear. TLP 418 may be made, e.g., of quartz, glass, plastic, or acrylic.

Figure 5:
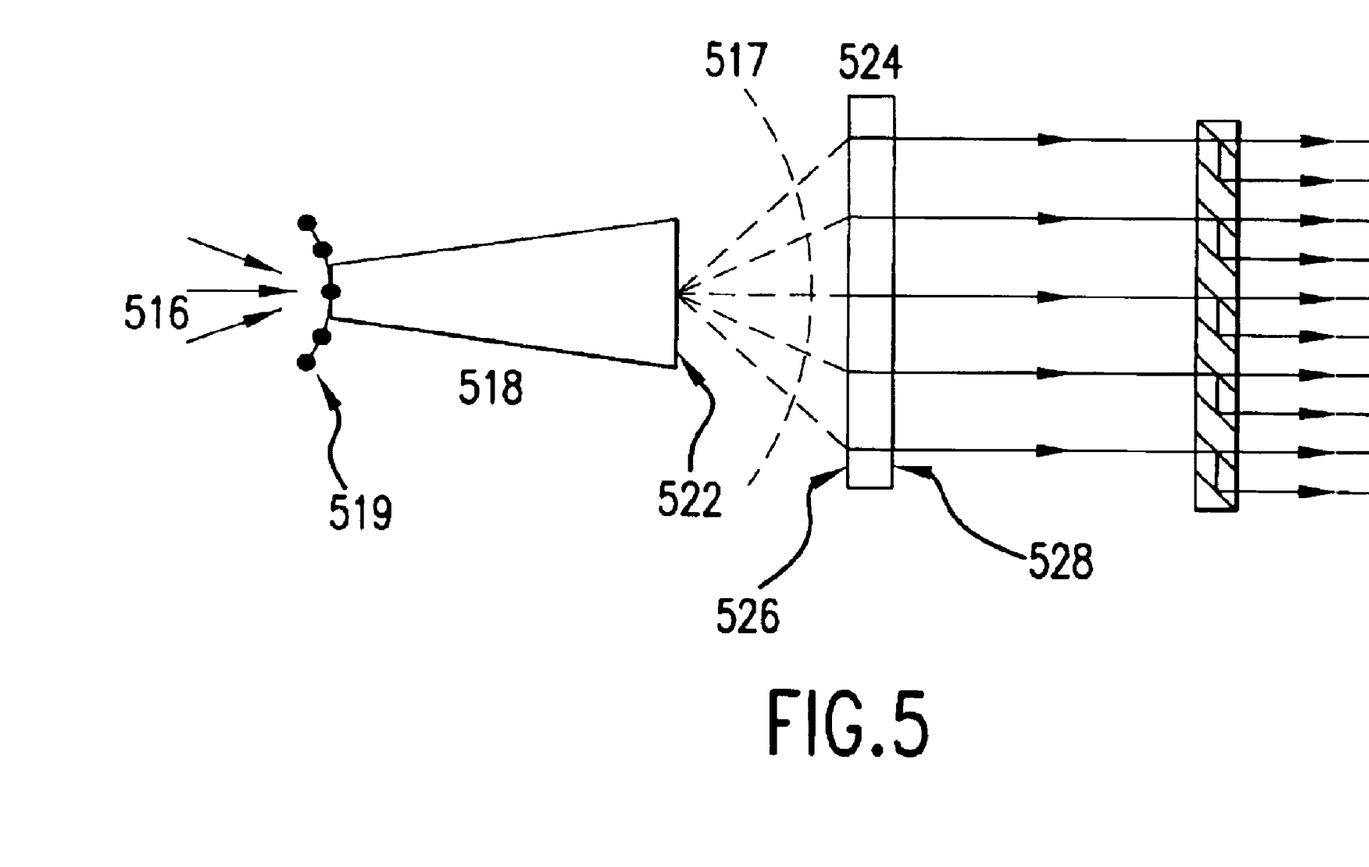
In FIG. 5 is shown a contoured delay element for use with the embodiment of FIG. 4.

As shown in FIG. 5, a contoured delay element 524 also having an input surface 526 and an output surface 528 may be placed so the input surface 526 is near the output surface 522 of the TLP 518 to collect and transmit substantially all of the radiation 516 arranged into images 519. In one embodiment, a purpose of the contoured delay element 524 may be to equalize the distance traveled by the various rays of radiation 516 as they exit the output surface 522 of TLP 518. The delay contour may, e.g., have a radial distribution from a center of contoured delay element 524 outward. In the case where the curved surface 519 formed by images 519 is convex, e.g., contoured delay element 524 may delay the light at the center relatively more than the beams of light along the edges, thus allowing the beams of light along the periphery of images 519 to catch up, and consequently flattening the curved surface 519 at the output of the contoured delay element 524.

In one embodiment, the contoured delay element 524 is a lens system. The lens system may have one or more lenses of the types including spherical convex, spherical concave, cylindrical convex, and cylindrical concave. The convex and concave surfaces include spheric and aspheric curves. The lens system is designed such that the output of the contoured delay element has a flat profile such that it couples light efficiently into the PBS array.

Although the contoured delay element 524 produces the desired result, most practical TLP's have different taper profiles in the horizontal and vertical directions. As a result, the contoured delay element 524 will have different power in these two directions, thus requiring the use of toroidal optical components.

Figure 6:
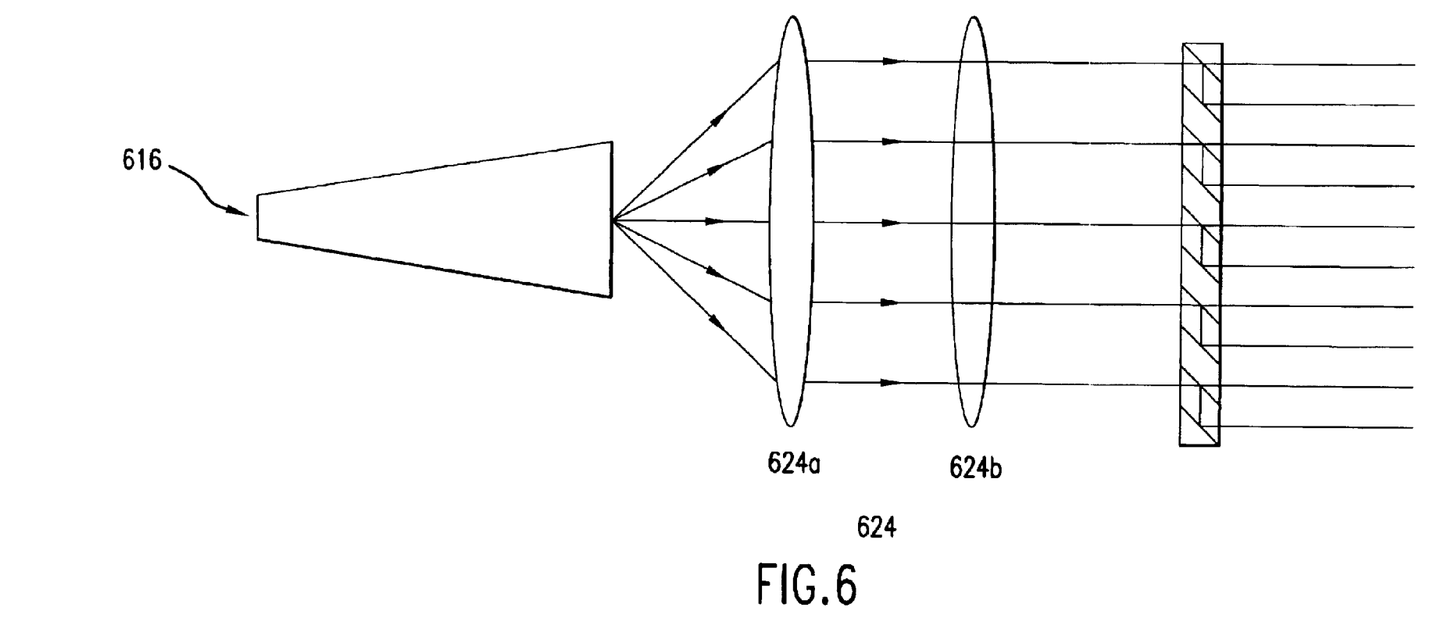
In FIG. 6 is shown an system of lenses according to a second embodiment of the invention.

In another embodiment, shown in FIG. 6, contoured delay element 624 is a series of lenses. Instead of using toroidal optical components, a first lens 624a could delay radiation 616 in a first, e.g. horizontal, dimension, while a second lens 624b delays radiation 616 in a second, e.g. vertical, dimension. Separate lenses, each devoted to a particular dimension, may be simpler to produce or offer greater design flexibility than a single lens.

Figure 7A:
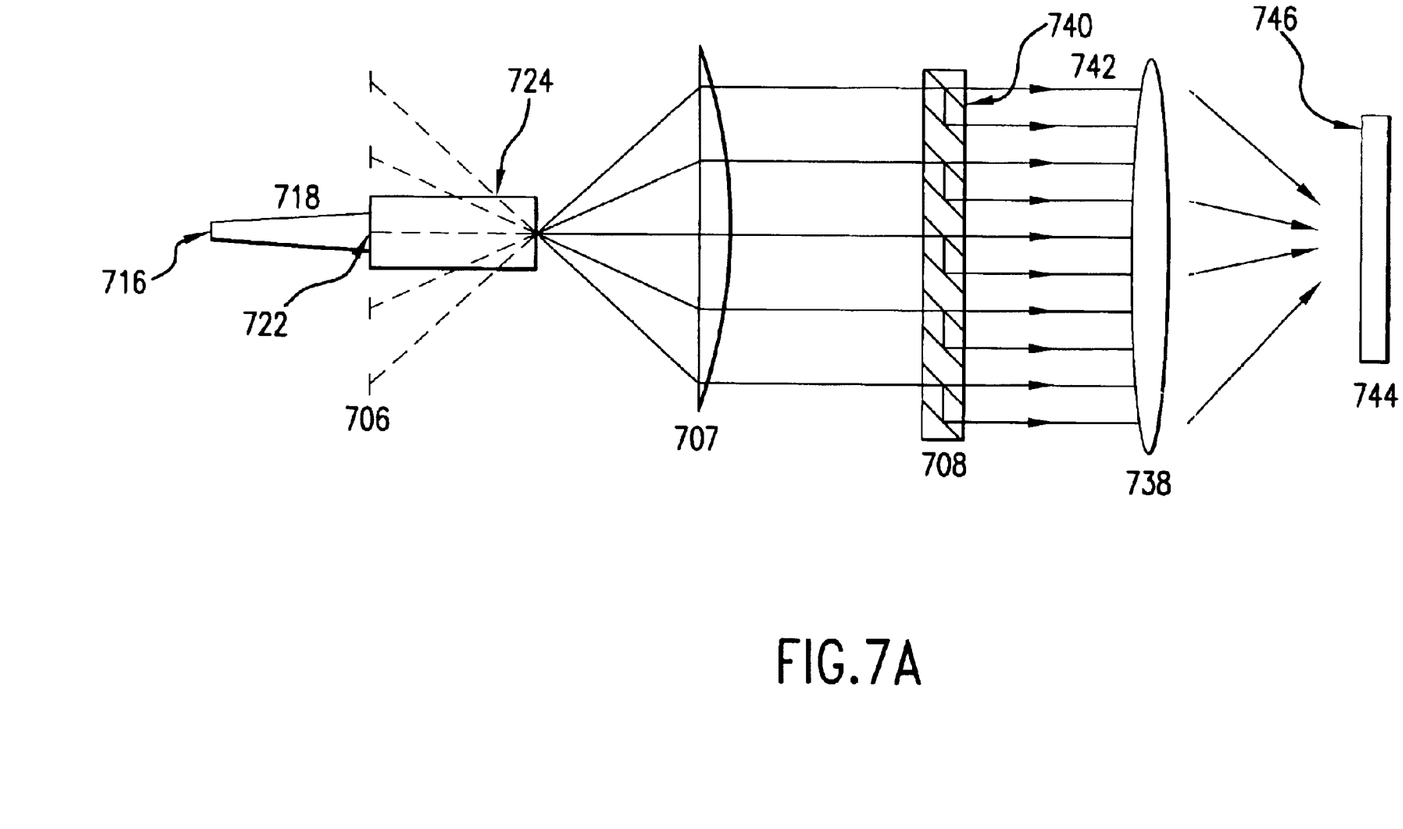
In FIG. 7a is shown a TLP/SLP combination according to a third embodiment of the invention.

In another embodiment, shown in FIG. 7a, contoured delay element 724 is a SLP. Instead of imaging the input light at the input of the TLP, the output of the TLP is used instead. Radiation 716 at the output end 722 of the TLP 718 is reflected by the sidewalls of the SLP 724 such that an image array 706 is produced. Since TLP 718 homogenizes the light output, the intensity profile at the output end 722 is uniform.

Figure 7B:
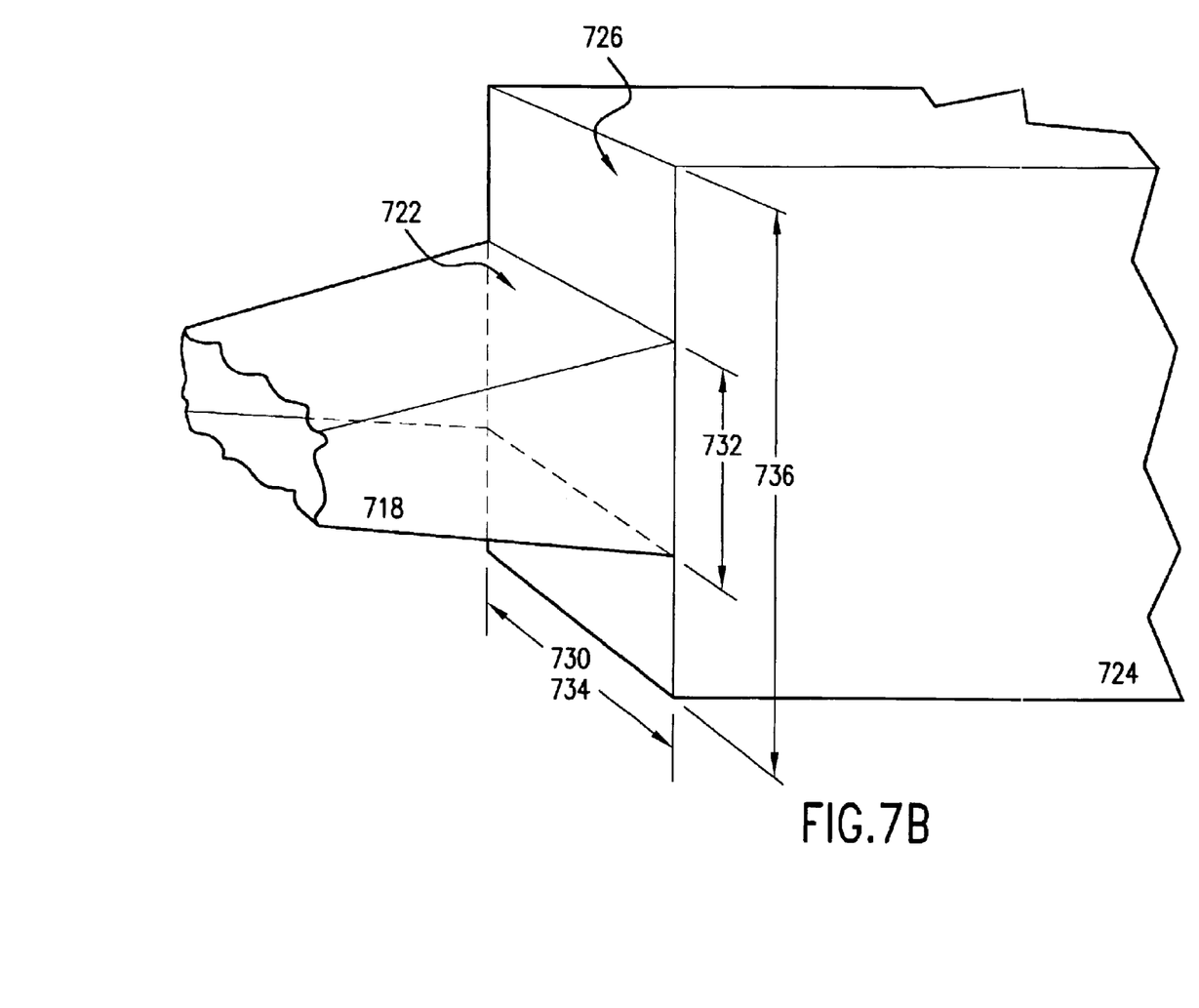

In a preferred embodiment, shown in FIG. 7b, the area of input surface 726 may be, e.g. twice the area of output surface 722. Length 736 may be, e.g. twice as long as length 732. In a refinement of this embodiment output surface 722 has a first output dimension 730 and a second output dimension 732, the second output dimension 732 being substantially orthogonal to the first output dimension 730. Input surface 726 has a first input dimension 734 corresponding to the first output dimension 730, and a second input dimension 736 corresponding to the second output dimension 732. First input dimension 730 may be substantially equal to first dimension 734, while second input dimension 736 may be substantially twice second output dimension 732, thus producing an area of input surface 726 that is twice the area of output surface 722.

Image array 706 is formed using the output end 722 of TLP 718 as the source of light. Image array 706 would appear as bright and dark bands in the visible range. These bands are then imaged by the imaging system 707 onto the PBS array 708 matching the input stripes on the PBS array, thus producing polarized light efficiently.

As shown in FIG. 7a, a focusing lens 738 may be placed near the output surface 740 of the PBS 708 array to receive the polarized beams of radiation 742. Focusing lens 738 then transmits them to an image projection system 744, where an image 746 may be illuminated by the radiation collected and focused at the focusing lens 738. The projection system 744 releases the collected and focused radiation 742 to display the image 746. In one embodiment, PBS 708 comprises a one-dimensional array. In another embodiment, PBS 708 comprises a two-dimensional array.

Figure 8:
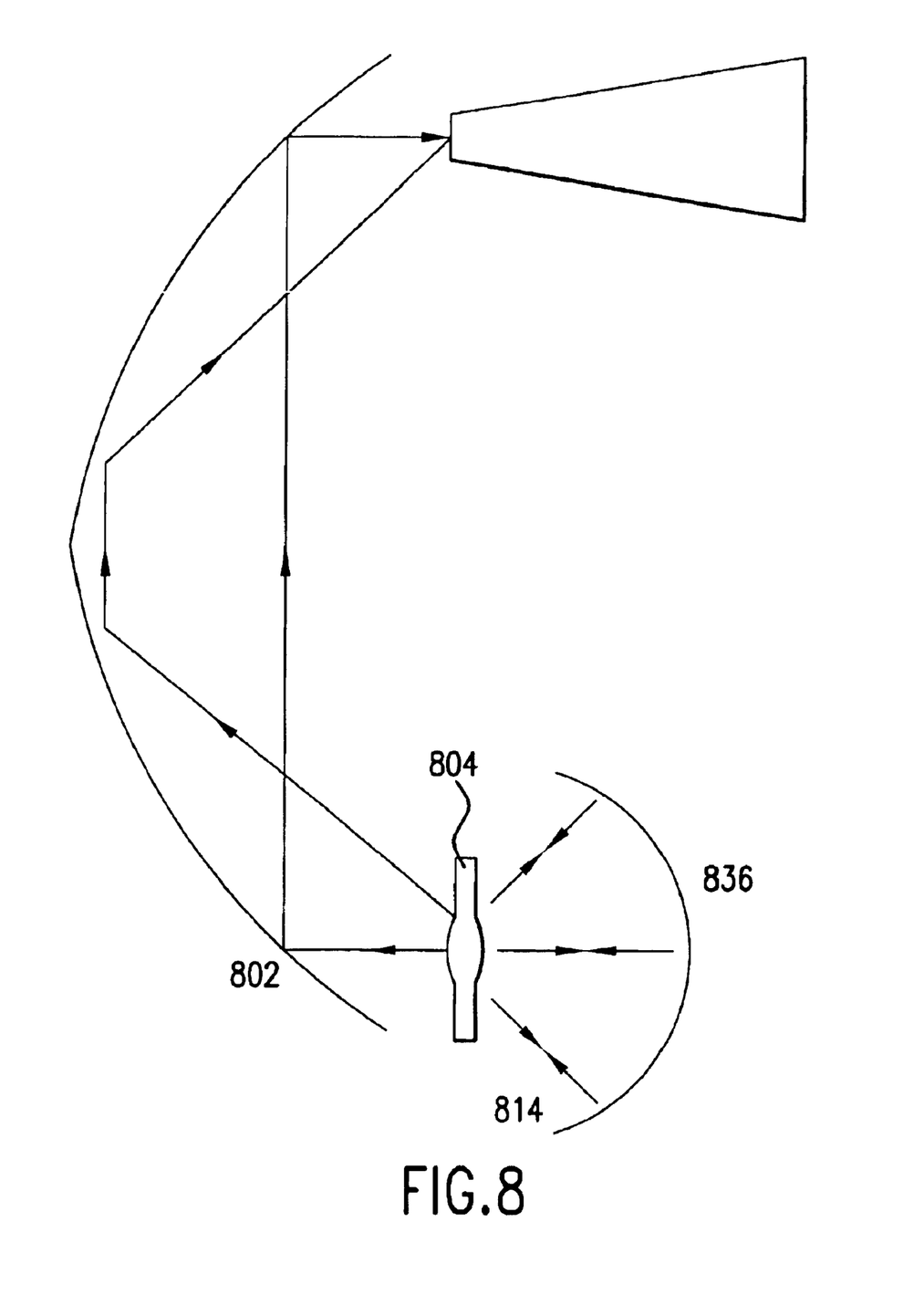
In FIG. 8 is shown a retro-reflector for use with an embodiment of the invention.

In an alternate embodiment, shown in FIG. 8, an additional reflector 836 may be placed to reflect at least part of that portion of the electromagnetic radiation from source 814 that does not impinge directly on first reflector 802 back toward first reflector 802 through the first focal point 804 of first reflector 8902 to increase the flux intensity of the converging rays. In a preferred embodiment, additional reflector 836 may be a spherical retro-reflector.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. An illumination engine comprising:
    a source of substantially focused electro-magnetic radiation;
    a TLP having an input surface and an output surface, said input surface of said TLP disposed to collect and transmit substantially all of said radiation, wherein said output surface of said TLP comprises further an output area
    a SLP having an input surface and an output surface;
    said input surface of said SLP disposed proximate to said output surface of said TLP to collect and transmit substantially all of said radiation, said input surface of said SLP comprising further an input area, and said input area of said SLP is larger than said output area of said TLP;
    a condenser lens disposed proximate to said output surface of said SLP to collect and transmit substantially all of said radiation; and
    a PBS disposed proximate to said condenser lens to collect and transmit substantially all of said radiation.

2. The illumination engine of claim 1, wherein said source of substantially focused electro-magnetic radiation comprises:
    a reflector having a first and second focal points;
    a source of electro-magnetic radiation disposed proximate to said first focal point of said reflector to emit rays of radiation that reflect from said reflector and converge substantially at said second focal point.

3. The illumination engine of claim 2, wherein said reflector comprises at least a portion of a substantially elliptical surface of revolution.

4. The illumination engine of claim 2, wherein said reflector comprises at least a portion of a substantially spherical surface of revolution.

5. The illumination engine of claim 2, wherein said reflector comprises a first reflector having a first optical axis, and said first focal point is a focal point of said first reflector, said illumination engine comprising further:
    a second reflector having a second optical axis placed substantially symmetrically to said first reflector such that said first and second optical axes are substantially collinear, and wherein said second focal point is a focal point of said second reflector; and
    wherein said rays of radiation reflect from said first reflector toward said second reflector and substantially converge at said second focal point.

6. The illumination engine of claim 5, wherein said first and second reflectors comprise at least a portion of a substantially elliptical surface of revolution.

7. The illumination engine of claim 5, wherein said first and second reflectors comprise at least a portion of a substantially toric surface of revolution.

8. The illumination engine of claim 5, wherein said first and second reflectors comprise at least a portion of a substantially spherical surface of revolution.

9. The illumination engine of claim 5, wherein said first and second reflectors comprise at least a portion of a substantially parabolic surface of revolution.

10. The illumination engine of claim 5, wherein:
said first reflector comprises at least a portion of a substantially elliptical surface of revolution; and
said second reflector comprises at least a portion of a substantially hyperbolic surface of revolution.

11. The illumination engine of claim 5, wherein:
said first reflector comprises at least a portion of a substantially hyperbolic surface of revolution; and
said second reflector comprises at least a portion of a substantially elliptical surface of revolution.

12. The illumination engine of claim 2, wherein said reflector has a coating that reflects only a pre-specified portion of the electro-magnetic radiation spectrum.

13. The illumination engine of claim 12, wherein said coating only reflects visible light radiation, a pre-specified band of wavelengths of radiation, or a specific color of radiation.

14. The illumination engine of claim 2, wherein a portion of the electro-magnetic radiation emitted by said source of electro-magnetic radiation impinges directly on said reflector and a portion of the electro-magnetic radiation does not impinge directly on said reflector and wherein said system further comprises an additional reflector constructed and arranged to reflect at least part of the portion of the electro-magnetic radiation that does not impinge directly on said reflector toward said reflector through the first focal point of said reflector to increase the flux intensity of the converging rays.

15. The illumination engine of claim 14, wherein said additional reflector comprises a spherical retro-reflector disposed on a side of said source opposite said reflector to reflect electro-magnetic radiation emitted from said source in a direction away from said reflector toward said reflector through the first focal point of said reflector.

16. The illumination engine of claim 2, wherein said source of electro-magnetic radiation comprises an arc lamp.

17. The illumination engine of claim 14, wherein said arc lamp comprises a lamp selected from the group comprising a xenon lamp, a metal halide lamp, an HID lamp, or a mercury lamp.

18. The illumination engine of claim 2, wherein said source of electro-magnetic radiation is selected from the group consisting of a halogen lamp, and a filament lamp.

19. The illumination engine of claim 1, wherein said input area of said SLP is substantially twice said output area of said TLP.

20. The illumination engine of claim 19, wherein:
said output area has a first output dimension and a second output dimension, said second output dimension being orthogonal to said first output dimension;
said input area has a first input dimension disposed proximate to said first output dimension and a second input dimension disposed proximate to said second output dimension;
said first input dimension is substantially equal to said first output dimension; and
said second input dimension is substantially twice said second output dimension.

21. The illumination engine of claim 20, wherein:
said electro-magnetic radiation is transmitted from said output surface of said SLP in substantially bright and dark bands; and
said bright and dark bands are matched substantially to said PBS.

22. The illumination engine of claim 1, wherein said SLP is comprised of a material selected from the group consisting of quartz, glass, plastic, or acrylic.

23. The illumination engine of claim 1, wherein said TLP is comprised of a material selected from the group consisting of quartz, glass, plastic, or acrylic.

24. The illumination engine of claim 1, wherein said reflector comprises at least a portion of a substantially toric surface of revolution.

25. The illumination engine of claim 1, comprising further:
a focusing lens disposed proximate to an output surface of said PBS;
an image projection system disposed proximate to an output side of said focusing lens;
an image being illuminated by the radiation collected and focused at said focusing lens, the projection system releasing the collected and focused radiation to display the image.

26. The illumination engine of claim 1, wherein said PBS comprises a one-dimensional array.

27. The illumination engine of claim 1, wherein said PBS comprises a two-dimensional array.

28. A method of illumination comprising the steps of:
producing substantially focused electro-magnetic radiation;
positioning a TLP having an input surface and output surface so said input surface of said TLP is substantially proximate to a focus of said substantially focused electro-magnetic radiation, wherein said output surface of said TLP comprises further an output area;
collecting said substantially focused electro-magnetic radiation at said input surface;
adjusting a numerical aperture of said electro-magnetic radiation by passing said electro-magnetic radiation through said TLP;
outputting said electro-magnetic radiation from said output surface of said TLP;
positioning a SLP having an input surface and output surface so said input surface of said SLP is substantially proximate to said output surface of said TLP said input surface of said SLP comprising further an input area, and said input area of said SLP is larger than said output area of said TLP;
flattening a contour of said electro-magnetic radiation by passing said electro-magnetic radiation through said SLP; and polarizing said electro-magnetic radiation.

29. The method of illumination of claim 28, wherein said step of producing substantially focused electro-magnetic radiation comprises the steps of:
positioning a source of electro-magnetic radiation at a first focal point of a reflector;
producing rays of radiation by said source;
reflecting said rays of radiation by said reflector toward a second focal point.

30. An illumination engine comprising:
a source of substantially focused electro-magnetic radiation;
a TLP having an input surface and an output surface, said input surface of said TLP disposed proximate to a focus of said substantially focused electro-magnetic radiation to collect and transmit substantially all of said electro-magnetic radiation;
a contoured delay element having an input surface and an output surface;

said input surface of said contoured delay element disposed proximate to said output surface of said TLP to collect and transmit substantially all of said electro-magnetic radiation;

a condenser lens disposed proximate to said output surface of said contoured delay element to collect and transmit substantially all of said electro-magnetic radiation; and a PBS disposed proximate to said condenser lens to collect and transmit substantially all of said electro-magnetic radiation.

31. The illumination engine of claim 30, wherein said source of substantially focused electro-magnetic radiation comprises:

a reflector having a first and second focal points;

a source of electro-magnetic radiation disposed proximate to said first focal point of said reflector to emit rays of radiation that reflect from said reflector and converge substantially at said second focal point.

32. The illumination engine of claim 31, wherein said reflector comprises at least a portion of a substantially elliptical surface of revolution.

33. The illumination engine of claim 31, wherein said reflector comprises at least a portion of a substantially spherical surface of revolution.

34. The illumination engine of claim 31, wherein said reflector comprises at least a portion of a substantially toric surface of revolution.

35. The illumination engine of claim 31, wherein said reflector is a first reflector having a first optical axis, and said first focal point is a focal point of said first reflector, said illumination engine comprising further:

a second reflector having a second optical axis placed substantially symmetrically to said first reflector such that said first and second optical axes are substantially collinear, and wherein said second focal point is a focal point of said second reflector; and wherein said rays of radiation reflect from said first reflector toward said second reflector and substantially converge at said second focal point.

36. The illumination engine of claim 35, wherein said first and second reflectors comprise at least a portion of a substantially elliptical surface of revolution.

37. The illumination engine of claim 35, wherein said first and second reflectors comprise at least a portion of a substantially toric surface of revolution.

38. The illumination engine of claim 35, wherein said first and second reflectors comprise at least a portion of a substantially spherical surface of revolution.

39. The illumination engine of claim 35, wherein said first and second reflectors comprise at least a portion of a substantially parabolic surface of revolution.

40. The illumination engine of claim 35, wherein:

said first reflector comprises at least a portion of a substantially elliptical surface of revolution; and said second reflector comprises at least a portion of a substantially hyperbolic surface of revolution.

41. The illumination engine of claim 35, wherein:

said first reflector comprises at least a portion of a substantially hyperbolic surface of revolution; and said second reflector comprises at least a portion of a substantially elliptical surface of revolution.

42. The illumination engine of claim 31, wherein said reflector has a coating that reflects only a pre-specified portion of the electro-magnetic radiation spectrum.

43. The illumination engine of claim 42, wherein said coating only reflects visible light radiation, a pre-specified band of wavelengths of radiation, or a specific color of radiation.

44. The illumination engine of claim 31, wherein a portion of the electro-magnetic radiation emitted by said source of electro-magnetic radiation impinges directly on said reflector and a portion of the electro-magnetic radiation does not impinge directly on said reflector and wherein said system further comprises an additional reflector constructed and arranged to reflect at least part of the portion of the electro-magnetic radiation that does not impinge directly on said reflector toward said reflector through the first focal point of said reflector to increase the flux intensity of the converging rays.

45. The illumination engine of claim 44, wherein said additional reflector comprises a spherical retro-reflector disposed on a side of said source opposite said reflector to reflect electro-magnetic radiation emitted from said source in a direction away from said reflector toward said reflector through the first focal point of said reflector.

46. The illumination engine of claim 31, wherein said source of electro-magnetic radiation comprises an arc lamp.

47. The illumination engine of claim 46, wherein said arc lamp comprises a lamp selected from the group comprising a xenon lamp, a metal halide lamp, an HID lamp, or a mercury lamp.

48. The illumination engine of claim 31, wherein said source of electro-magnetic radiation is selected from the group consisting of a halogen lamp, and a filament lamp.

49. The illumination engine of claim 30, wherein said contoured delay element is a lens.

50. The illumination engine of claim 49, wherein said lens is a first lens for delaying radiation in a first dimension and said illumination engine comprises further a second lens for delaying radiation in a second dimension.

51. The illumination engine of claim 50, wherein said first dimension is substantially orthogonal to said second dimension.

52. The illumination engine of claim 49, wherein said lens is comprised of a material selected from the group consisting of quartz, glass, plastic, or acrylic.

53. The illumination engine of claim 30, wherein said TLP is comprised of a material selected from the group consisting of quartz, glass, plastic, or acrylic.

54. The illumination engine of claim 30, comprising further:

a focusing lens disposed proximate to an output surface of said PBS;

an image projection system disposed proximate to an output side of said focusing lens;

an image being illuminated by the radiation collected and focused at said focusing lens, the projection system releasing the collected and focused radiation to display the image.

55. The illumination engine of claim 30, wherein said PBS comprises a one-dimensional array.

56. The illumination engine of claim 30, wherein said PBS comprises a two-dimensional array.

57. A method of illumination comprising the steps of:

producing substantially focused electro-magnetic radiation;

positioning a TLP having an input surface and output surface so said input surface of said TLP is substantially proximate to a focus of said substantially focused electro-magnetic radiation;

collecting said substantially focused electro-magnetic radiation at said input surface;

adjusting a numerical aperture of said electro-magnetic radiation by passing said electro-magnetic radiation through said TLP;

outputting said electro-magnetic radiation from said output surface of said TLP;

positioning a contoured delay element having an input surface and output surface so said input surface of said contoured delay element is substantially proximate to said output surface of said TLP;

flattening a contour of said electro-magnetic radiation by passing said electro-magnetic radiation through said contoured delay element; and polarizing said electro-magnetic radiation.

58. The method of illumination of claim 57, wherein said source of substantially focused electro-magnetic radiation comprises:

a reflector having a first and second focal points;

a source of electro-magnetic radiation disposed proximate to said first focal point of said reflector to emit rays of radiation that reflect from said reflector and converge substantially at said second focal point.

59. The method of illumination of claim 57, wherein said contoured delay element comprises a lens.

* * * * *